US012727608B2

(12) United States Patent
Jochems et al.

(10) Patent No.: US 12,727,608 B2
(45) Date of Patent: Sep. 8, 2026

(54) STABLE LIQUID ANIMAL FEED INGREDIENT

(71) Applicant: PURAC BIOCHEM B.V., Gorinchem (NL)

(72) Inventors: Evelien Johanna Marinus Jochems, Gorinchem (NL); Martinus Adrianus Gertrudus Jansen, Gorinchem (NL)

(73) Assignee: Pathway Intermediates Limited, Shrewsbury (GB)

( * ) Notice: Subject to any disclaimer, the term of this patent is extended or adjusted under 35 U.S.C. 154(b) by 682 days.

(21) Appl. No.: 18/013,791

(22) PCT Filed: Nov. 20, 2020

(86) PCT No.: PCT/EP2020/082979
§ 371 (c)(1),
(2) Date: Dec. 29, 2022

(87) PCT Pub. No.: WO2021/038113
PCT Pub. Date: Mar. 4, 2021

(65) Prior Publication Data

US 2023/0240331 A1 Aug. 3, 2023

(30) Foreign Application Priority Data

Jul. 3, 2020 (EP) .................................... 20184060
Nov. 2, 2020 (EP) .................................... 20205253

(51) Int. Cl.
*A23K 20/105* (2016.01)
*A23K 10/00* (2016.01)
*A23K 40/00* (2016.01)

(52) U.S. Cl.
CPC ............ *A23K 20/105* (2016.05); *A23K 10/00* (2016.05); *A23K 40/00* (2016.05)

(58) Field of Classification Search
CPC .... A23K 10/00; A23K 20/105; A23K 20/158; A23K 40/00
See application file for complete search history.

(56) References Cited

U.S. PATENT DOCUMENTS 4,921,711 A 5/1990 Kiefer et al.
2009/0082253 A1 3/2009 Otto et al.
2015/0057345 A1 2/2015 Boomsma et al.

FOREIGN PATENT DOCUMENTS

EP 0156193 A2 10/1985
EP 1483975 A1 12/2004
(Continued)

OTHER PUBLICATIONS

Translation of Feb. 2, 2024 Office Action Issued in Japanese Patent Application No. 2022-581663.
(Continued)

*Primary Examiner* — Vera Stulii
(74) *Attorney, Agent, or Firm* — Foley & Lardner LLP

(57) ABSTRACT

A stable liquid ingredient composition for liquid animal feed, which is stable from 0 to about 40° C. and also forms a stable dispersion in water. The composition includes oleyl lactylate and salts thereof (OL), and a further lactylate selected from lauroyl lactylate and salts thereof (LL), or a mixture of lauroyl lactylate and myristoyl lactylate and/or their salts (LL/ML blend). The weight ratio of the lactylate selected from LL or the LL/ML blend to OL in the stable liquid ingredient composition ranges from 1/99 to 60/40. The stable liquid ingredient composition may optionally include a diluent. The composition provides an alternative to solid feed ingredients or additives and can be applied as ingredient in liquid feed for animals such as in drinking water. Use of the stable liquid ingredient composition allows a reduction in the use of antibiotics and helps to maintain a good health of the animal.

8 Claims, 1 Drawing Sheet

(56) References Cited

FOREIGN PATENT DOCUMENTS

Figure 1:
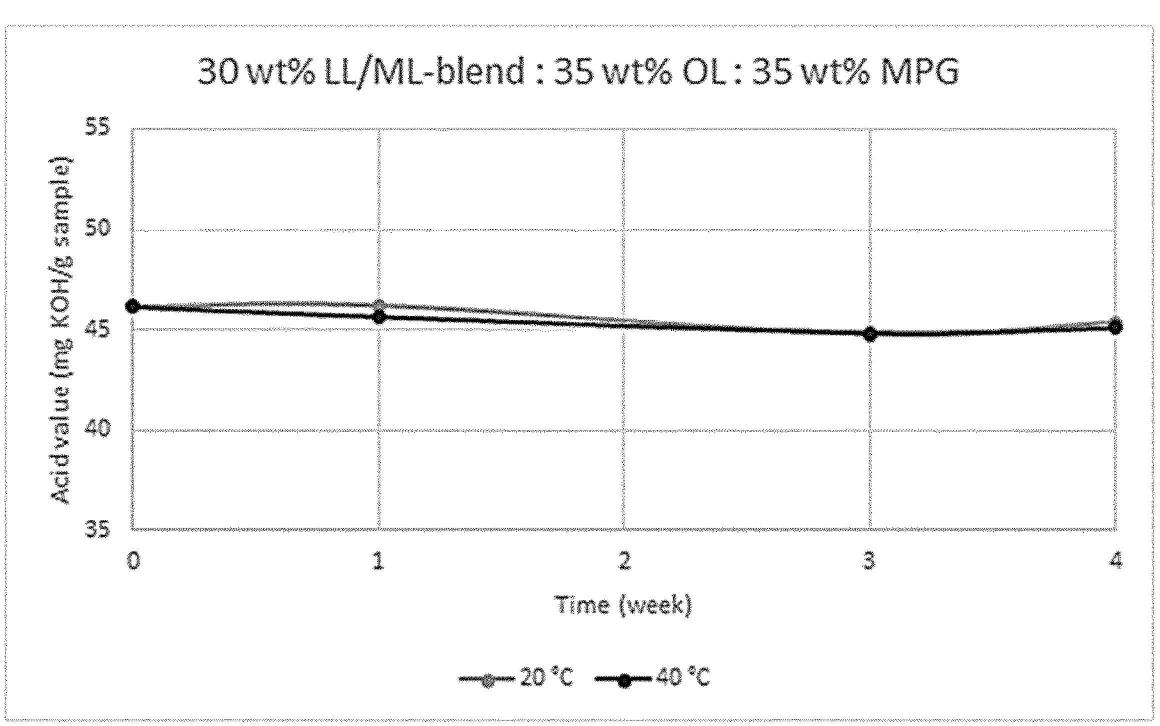

| | | | |
|---|---|---|---|
| EP | 2745877 | A1 | 6/2014 |
| WO | 2009092787 | A1 | 7/2009 |
| WO | 2013007558 | A2 | 1/2013 |
| WO | 2015063014 | A1 | 5/2015 |

OTHER PUBLICATIONS

Jan. 9, 2024 Office Action issued in Chinese Patent Application No. 202080102671.2.

Mar. 10, 2021 International Search Report issued in International Patent Application No. PCT/EP2020/082979.

Mar. 10, 2021 Written Opinion of the International Searching Authority issued in International Patent Application No. PCT/EP2020/082979.

STABLE LIQUID ANIMAL FEED INGREDIENT

FIELD

The present invention is directed to a stable liquid ingredient composition for animal feed comprising a combination of oleyl lactylate and/or salt thereof (hereinafter referred to as OL) with a further lactylate selected from lauroyl lactylate and/or salt thereof (hereinafter referred to as LL or C12 lactylate), or a mixture of lauroyl lactylate and myristoyl lactylate (ML or C14 lactylate) and/or their salts (the mixture hereinafter referred to as LL/ML blend), the use of said stable liquid ingredient composition as component of a stock solution, the use of said stable liquid ingredient composition and the use of said stock solution in liquid animal feed such as for example in drinking water, and a method for preventing or reducing antibacterial infections in animals by feeding the animals an antibacterial liquid feed.

BACKGROUND

Lactylate and lactylate mixtures are known for their suitability as antimicrobial agent for animal health by preventing and/or reducing infections caused by undesired microorganisms in said animals. It is therefore attractive to apply lactylates and lactylate mixtures as ingredient in animal feed. The application of lactylate and lactylate mixtures as ingredient in animal feed have been described.

WO 2009/092787 pertains to preventing or treating intestinal infections caused by gram-positive bacteria in animals by using an antibacterial compound selected from certain defined lactylates, glycolylates, lactate esters or glycolic acid esters. The lactylates are preferably lauroyl lactylate, myristoyl lactylate, their salts and mixtures thereof. The lactylates may be administered to the animals as a solid or liquid component of a conventional animal feed composition or in their drinking water. US 2015/0057345 pertains to a method for improving the feed efficiency in poultry husbandry wherein poultry is provided with a compound directly upon hatching, the compound preferably being lauroyl lactylate, myristoyl lactylate, their salts and mixtures thereof. The compound may be administered to the animals as a solid or liquid component of a conventional (solid) feed composition or a liquid feed such as drinking water.

WO 2013/007558 describes free-flowing powders of lactylates on a carrier which can be administered to animals as a component of a conventional solid animal feed composition. Preferred lactylates are lauroyl lactylate, myristoyl lactylate, their salts and mixtures thereof. These lactylate compositions were found to be very effective for maintaining a healthy gut flora and therefore improving the animal performance like improving the Feed Conversion Rate (FCR) and improving the Body Weight (BW). Fatty acid lactylates, and in particular C10-C16 lactylates (lactylates of fatty acids having 10 to 16 carbon atoms), are known to have difficult handling properties in the ambient temperature. The C10-C16 lactylates have a melting range which is in the region of ambient or room temperature. This means that during storage the consistency of the C10-C16 lactylates may vary from solid to liquid with paste-like composition in between. Commercial C10-C16 lactylates have a wide range of melting points and, due to varying conditions during storage and transport, this can lead to an inhomogeneous blend of the various components, which is difficult to process further into animal feed composition. This problem is conveniently addressed by providing the lactylates as a solid ingredient for example by attaching the lactylate to a support to obtain a solid powder as described in WO 2009/092787 and US 2015/0057345, or by incorporating the lactylate in a porous carrier to obtain a free flowing powder such as described in WO 2013/007558. A commercially available mixture of lauroyl and myristoyl lactylate is Aloapur® (ex Corbion Purac), a complementary animal mineral feed comprising a blend of sodium lauroyl lactylate and sodium myristoyl lactylate (LL/ML-blend) on a diatomaceous earth carrier. It is in powder form and added to animal feed. When consumed by animals, it has antimicrobial efficacy which helps to maintain a healthy gut flora.

A disadvantage of these solid lactylate feed ingredients is its relative inflexibility in that for each feed product a specific type of support or porous carrier may be required, e.g., a carrier of one type for one type of animal, and a carrier of another type for another type of animal. Additionally, the presence of any non-digestible (inorganic) support or porous carrier means that the addition of lactylate to a feed product may be accompanied by the addition of a component which by itself does not contribute to the nutritional properties of the feed, e.g., when diatomaceous earth is used as the porous carrier. A further disadvantage of solid lactylate feed ingredients is that they are not suitable to combine with liquid animal feed such as drinking water because of inhomogeneous dispersion and precipitation of the solid lactylate ingredients.

Hence there is a need for the direct incorporation of lactylates, in particular C12 and C14 lactylates, into a feed without adding undesirable components, which is so flexible that it can be applied to different types of feed and in different concentrations as desired, without the transport and storage problems associated with C10-C16 lactylates. In particular C12 and C14 lactylates are difficult to handle due to their physical properties and cannot directly be applied in liquid feed compositions.

The present invention provides for such direct incorporation of lactylates into a feed. It was found that a stable liquid animal feed ingredient composition comprising lauroyl lactylate (LL), a mixture of lauroyl lactylate and myristoyl lactylate (LL/ML blend) or salts thereof could be obtained by stabilizing the liquid animal feed ingredient composition with oleyl lactylate (OL) and salts thereof.

It is known to provide lactylates in liquid form into a feed. WO 2015/063014 pertains to a method for manufacturing a feed product comprising the steps of: providing a lactylate product, wherein the lactylate product comprises at least 30 wt. % of C10-C16-fatty acid lactylates, in liquid form at a first location; transferring lactylate product in the liquid form to a transport unit; transporting the lactylate product in the transport unit to a second location, with the lactylate product being in solid form, in liquid form, or in an intermediate state during transport; if the lactylate product is solidified or partly solidified, converting the lactylate product to the liquid form in the transport unit; removing the lactylate product from the transport unit in liquid form at the second location; and, contacting the lactylate product in liquid form with a feed product. This method was found particular suitable for lauroyl lactylate, myristoyl lactylate, and mixtures of lauroyl and myristoyl lactylates, which are difficult to handle at ambient temperatures. A disadvantage of this method is that elevated temperatures of at least 60° C. or more are required to bring the lactylates in a liquid homogeneous state. The method requires such heating to prevent phase separation which lead to inhomogeneous mixtures. A further disadvantage of this method is that the feed product with which the heated liquid lactylate composition is combined has to be a solid feed product.

It is further known that addition of a diluent may help to reduce the viscosity and will bring the lauroyl and myristoyl lactylates in somewhat better state to handle. However, it was found that this still does not lead to a stable liquid lactylate ingredient composition. It was further found that when adding such a liquid lactylate ingredient to a liquid feed composition, directly or via first making a stock solution comprising the liquid lactylate ingredient, said liquid feed composition and the stock solution itself also became unstable in the sense that the lactylate liquid ingredient partially solidified and/or partially settled. This is in particular the case at the lower outside temperatures, lower than ambient temperature, where the liquid ingredient composition, stock solution or the liquid feed is stored and/or fed to said animals. In the example of drinking water as liquid feed composition, the drinking water further showed a bad non-homogenous dispersity in the form of visible precipitation or flakes or an undesired partial phase separation.

Hence there is a need for liquid ingredient compositions of lauroyl lactylate and mixtures thereof with myristoyl lactylate that are stable and do not display phase transitions at ambient temperatures or lower, more in particular at the lower outside temperatures. There is also a need for liquid ingredient compositions of lauroyl lactylate and mixtures thereof with myristoyl lactylate that allow the making of a stock solution comprising the liquid antimicrobial ingredient, whereby the stock solution is stable and does not display phase transitions at ambient temperatures.

The present invention provides for such stable liquid ingredient compositions comprising a lactylate selected from lauroyl lactylate (LL) or a mixture of lauroyl lactylate and myristoyl lactylate (LL/ML) or salts thereof, and in addition oleyl lactylate (OL) or a salt thereof, wherein said stable liquid lactylate ingredient compositions are suitable for application as ingredient into animal feed.

The stable liquid ingredient composition comprising oleyl lactylate (OL) and salts thereof and a further lactylate selected from lauroyl lactylate (LL) and a mixture of lauroyl lactylate and myristoyl lactylate (LL/ML) or salts thereof in particular allow the application of these lactylates into liquid animal feed compositions such as for example drinking water, milk and milk replacers and the like. Dosing the liquid lactylate compositions of this invention was found to be more flexible and easier than dosing solid lactylate compositions, for example through the use of syringes (for dedicated application for one or a few selected animals) or through the use of the drinking water (to reach multiple animals at the same time), the losses of product can be better controlled. In case of animals with affected health, the liquid lactylate ingredient composition allows a manner of effectively feeding the antimicrobial compounds through the drinking water, which is easier than through solid compositions because most animals keep on drinking but refuse or will eat less when they are sick.

LEGEND OF FIGURES

FIG. 1: Acid value as a function of storage time at 20° C. and 40° C. for a LL/ML-blend:OL:MPG=30:35:35 by weight.

Figure 2:
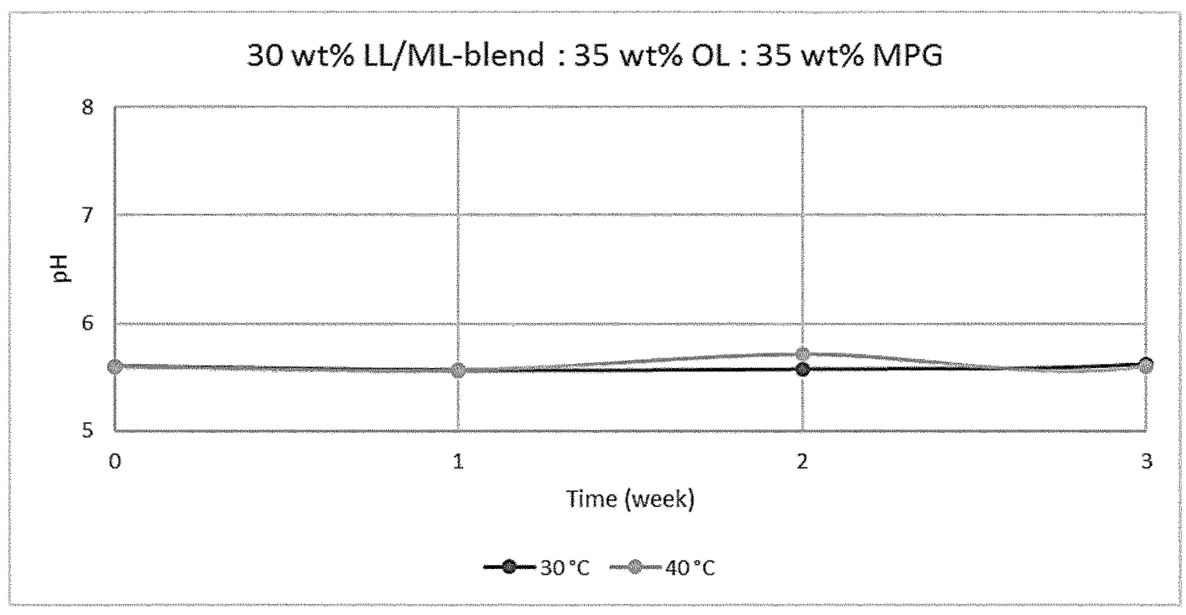

FIG. 2: pH as a function of storage time at 30° C. and 40° C. for a LL/ML-blend:OL:MPG=30:35:35 by weight.

DETAILED DESCRIPTION

The present description pertains to a stable liquid ingredient composition comprising a lactylate selected from lauroyl lactylate and/or salt hereof (hereinafter referred to as LL or C12 lactylate), or mixtures of lauroyl lactylate and myristoyl lactylate and/or their salts (hereinafter referred to as LL/ML-blend, wherein ML refers to myristoyl lactylate or C14 lactylate and/or salt thereof), the composition being stabilised by the presence of oleyl lactylate and/or salt thereof (OL). Oleyl lactylate is also referred to as oleoyl lactylate and the two terms are used interchangeably.

Suitable salts are sodium, potassium, calcium, magnesium, zinc, ammonium ($NH_4$), iron (Fe(II)), or copper salts Cu(II). For the application of stable liquid ingredient composition in aqueous liquid animal feed such as for example but not limited to drinking water, best results are obtained with sodium and potassium salts.

With stable, it is meant that the liquid ingredient composition remains in liquid state and homogenous at a temperature in the range of 0° C., preferably around 0.5 or 1° C. up to and including 40° C. for at least 3, preferably at least 3.5 to 4 weeks, or 21, 25, 26 or 28 days. During that period and within this temperature range, the composition does not form a gel, is not susceptible to visual phase separation and does not precipitate. No phase separation visually observed means that no distinct phases have been observed (so visually only one phase occurred) nor the occurrence of droplets of one phase on the surface of the other phase was observed, similar to oily droplets on an aqueous surface. Ambient temperatures are defined as temperatures in the range of 20° to 25° C.

Upon dilution of the stable liquid ingredient composition in water to form a stock solution, the resulting stock solution preferably also forms a stable dispersion or emulsion. Within the context of a stable dispersion or emulsion, the term stable means that it does not gel, does not solidify, is not susceptible to visual phase separation and does not precipitate for at least 1, preferably at least 2 or 3 weeks or 7, 14, 18 or 21, days within the temperature range of 0° C., preferably around 0.5 or 1° C. up to and including 20-25° C. and in some formulations even up to and including 40° C. A stable stock solution will help in more easy and more efficient handling and dosing to the animals.

When the liquid ingredient composition of the invention comprises lauroyl lactylate or its salt as selected lactylate, said composition thus comprising a combination of LL and OL, both lactylate components are present in the liquid ingredient composition in a LL/OL ratio ranging from about 1/99 to 60/40 by weight. The lower limit of the range (LL content in view of the OL content) of the LL/OL ratio is from about 1/99 by weight, preferably from about 10/90, 20/80, 25/75 by weight, more preferably from about 30/70, 35/65, 40/60, 45/55 by weight, even more preferably 50/50. The upper limit of the range (LL content in view of OL content) of the LL/OL ratio is to 60/40 by weight, more preferably to about 55/45 and most preferably to around 50/50 by weight. The various upper and lower limits of above ranges Of LL/OL ratio may be combined, such as for example the LL/OL ratio may range from about 30/70 to about 55/45, or from about 45/55 to about 55/45.

When a mixture of LL and ML and/or their salts is used in combination with OL, the (LL/ML-blend)/OL ratio varies in similar ranges as described above for the LL/OL ratio. The (LL/ML-blend)/OL ratio preferably ranges from 30/70 to 55/45, more preferably from about 45/55 to 55/45 by weight. The ratio of LL and ML(LL/ML) in the LL/ML-blend itself may vary from: 50/50 to 99/1 by weight. Preferably, the mixture of LL and ML comprises, based on the total amount of LL and ML, 50-95 wt. % of LL and 50-5 wt. % ML, in particular 50-90 wt. %, more in particular 60-80 wt. %, preferably 65-75 wt. % of LL and 50-10 wt. %, preferably 40-20 wt. % and more preferably 35-25 wt. % of ML. In particular the mixture of LL and ML comprises 65-75 wt. % of LL and 35-25 wt. % of ML, based on the total amount of LL and ML. The mixture may also comprise the sodium, potassium, calcium, magnesium, zinc, ammonium ($NH_4$), iron (Fe(II)), or copper salts Cu(II) of said lactylates.

In a preferred embodiment the liquid ingredient composition comprises 40-90 wt. % OL and 10-60 wt. % of the lactylate selected from LL or LL/ML-blend wherein the weight percentages are based on the total weight of lactylates. OL may be present in the liquid ingredient composition in higher concentrations than the lactylate selected from LL or LL/ML-blend. Most preferably OL and the lactylate selected from LL or the LL/ML-blend are present in equal concentrations. OL may also be present in slightly lower concentrations than the lactylate selected from LL or the LL/ML-blend, but is preferably present in concentrations not lower than around 65, 70, 75, 80, to 85, 90 to 95% of the concentration of the lactylate selected from LL or LL/ML blend in said liquid ingredient composition.

Optionally a diluent is added to the composition, preferably in an amount ranging from 1-70 wt. %, preferably 10-60 wt. %, more preferably 20-50 wt. % based on the total weight of the composition, with the purpose of reducing the viscosity of the liquid ingredient composition. Not any diluent is suited however. It was found that the addition of monopropylene glycol (i.e. 1,2-propanediol), sunflower oil or tricaprylin can lower the viscosity of the liquid composition without hampering its stability. The addition of one of these diluents and/or combinations hereof improve the handling and dosing of the composition at room temperature and at the lower temperature of around 0, 1 to 5 degrees Celsius. Thus, the liquid ingredient composition according to the invention may further comprise a diluent, preferably a diluent selected from monopropylene glycol (i.e. 1,2-propanediol), sunflower oil, tricaprylin or a mixture of two or more of these diluents. Particularly preferred is a liquid ingredient composition according to the invention comprising monopropylene glycol as diluent.

It has been observed that in the presence of any diluent, OL may be present in higher or equal concentrations than the concentration of the lactylate selected from LL or the LL/ML-blend in the liquid ingredient composition.

Monopropylene glycol (abbreviated as MPG) is most preferred as diluent. In a preferred embodiment a liquid ingredient composition according to the present invention comprises 10 to 40 wt. %, preferably 30 or 35 to 40 wt. % LL/ML-blend (or LL), 20 to 80 wt. %, preferably 20 to 70 wt. %, more preferably 30, 35, 40, 45, 50, 60, 65 or 70 wt. % OL, and 10, 20, or 30 to 40, 50 to 60 wt. % MPG, wherein the weight percentages are based on the total amount of selected lactylate, OL and MPG. Preferably the composition comprises about 25-35 wt. % of the lactylate selected from LL or LL/ML-blend (the blend being preferred most), 25-35 wt. % of the OL and 30-50 wt. % of MPG, based on the total amount of the selected lactylate, OL and MPG. Most preferred are the compositions comprising 30/30/40, 35/35/30 or 30/35/35 (the lactylate selected from LL or LL/ML-blend)/OL/MPG. In another embodiment the total weight percentage of lactylates in the composition, namely the total weight percentage of the OL and the lactylate selected from LL or LL/ML blend is equal or higher than the weight percentage of MPG in the composition. Preferably the total weight percentage of OL and further lactylate selected from LL or LL/ML-blend in the composition is higher than the weight percentage of the diluent in the composition.

The present invention is also directed to the use of a composition according to the invention as ingredient of liquid feed for animals, more specifically liquid feed for poultry (preferably broiler, laying hens and turkey), swine (preferably piglets, sows, fattening pigs), rabbits, ruminants (preferably dairy cows, calves, beef, goats and sheep) and companion animals (preferably dogs, cats, horses). With liquid feed is meant any liquid that may be fed to the animals, directly or via drinking systems, such as for instance milk, milk replacers, mush, or plain drinking water. The final concentration of the liquid ingredient composition in liquid animal feed, preferably drinking water, may range from 0.01 to 1.0 wt. %, preferably from 0.01 to 0.5, 0.6 or 0.7 wt. %, more preferably from 0.03 or 0.05 wt. % to 0.15, 0.20 or 0.25 wt. % and most preferably from 0.05 to 0.1 wt. %

The liquid ingredient composition itself may also be fed directly to the animals using for example a spoon or syringe and may be even be dosed via an injection/or intravenous feeding.

The liquid ingredient composition may also be applied on the surface of a solid animal feed product.

The liquid ingredient composition can also be used to make a stock solution that is stable and does not display phase transitions at ambient temperatures. The resulting stock solution preferably forms a stable dispersion or emulsion. Within the context of a stable dispersion or emulsion, the term stable means that it does not gel, does not solidify, is not susceptible to visual phase separation and does not precipitate for at least 1 week, preferably at least 2 or 3 weeks, more preferably for at least 7, 14, 18, or 21, days within the temperature range of from 0° C., preferably around 0.5 or 1° C. up to and including 20-25° C. and in some formulations even up to and including 40° C. A stable stock solution will help in more easy and more efficient handling and dosing to the animals. Thus, in another embodiment the present invention provides a stock solution comprising from about 0.4 to 12 wt. % of the stable liquid ingredient composition according to the invention in water based on the total weight of the stock solution. This stock solution can be stored by farmers and may be readily/directly used via a so-called Dosatron® dosing system or other dosing systems known to the skilled person. The stock solution may be further diluted to the desired viscosity and concentration when needed and dosed. Typical viscosities suitable for use in a Dosatron® system range from 200 cP to 800 cP, preferably between 500-700 cP measured with a Brookfield DV-I prime LVDV-IP viscometer at room temperature. The final concentration of the liquid ingredient composition according to the present invention in a stock solution according to the invention may be from 0.4 to 12 wt. %, preferably from 0.4 to 10 wt. %, more preferably from 0.5 to 7.5 wt. %, and most preferably from 0.5 to 5.0 wt. % based on total weight of the stock solution. Highly stable stock solutions can be obtained when the liquid ingredient composition comprises a diluent, in particular with MPG as diluent.

The liquid ingredient composition can be applied as ingredient in liquid feed for animals such as for example in drinking water to provide an alternative to solid feed ingredients or additives. The liquid ingredient composition was found to be very effective against gram positive bacteria like *Streptococcus suis, Clostridium perfringens, Clostridium sporogenes*, and *Clostridium tyrobutyricum* and its application as ingredient in animal feed, in particular liquid animal feed, provides a suitable alternative for antibiotics, thereby reducing the use of antibiotics. Generally, sick animals, in particular animals suffering from intestinal bacterial infections, will stop eating but they continue to drink. An advantage of the stable liquid ingredient composition and its application in liquid animal feed is that the composition can be administered to animals via their drinking water even when they are sick. So the stable liquid ingredient composition and its application in liquid animal feed allows the farmer more flexibility in applying the lactylates and lactylate mixtures of the invention as ingredient in animal feed to maintain a good health of the animal. Thus, the present invention is also directed to a method for preventing or reducing bacterial infections in animals by feeding said animals a liquid animal feed according to the present invention.

The liquid ingredient composition may also be used as a washing formulation for the mouth of calves and/or for "teat dipping" of the mother when calves are feeding through their mother.

The liquid ingredient composition of the present invention can be prepared by either a physical blending process comprising the blending of the lactylate selected from LL or LL/ML-blend in molten state with OL and optionally a diluent of the present invention at elevated temperature and inert conditions (process 1) or by a process that is a so-called one-pot synthesis wherein all respective fatty acids that correspond to the lactylates of the final liquid ingredient composition are mixed together in a reactor prior to the addition of lactic acid and subsequently reacted with lactic acid and a base at elevated temperatures and under inert conditions to obtain in-situ a LL/OL or (LL/ML-blend)/OL lactylate mixture (process 2). Upon completion of the reaction, a portion of the reaction product is optionally blended with the diluent of the present invention. Commercially available LL/ML blends are available such as for example the Pationic® 138c ex Corbion. OL is also commercially available such as for example the product Olacta® ex Corbion. In a preferred embodiment the lactylates of the liquid ingredient composition are prepared by one-pot synthesis.

Process 1 comprises melting the lactylate selected from LL or LL/ML-blend in an oven at a temperature between 70 and below 100 degrees Celsius, and more preferably of about 85 to 90 or to 95 degrees Celsius prior to use. The pre-heated lactylate selected from LL or LL/ML-blend is added to a pre-heated reaction vessel and kept at between 70 to 80 or to 90 degrees Celsius under continuous stirring and preferably under a nitrogen blanket or other conditions to create an inert atmosphere. Subsequently, OL is added to the reactor in the desired weight ratio. The mixture may optionally be diluted by addition of the diluent of the present invention, preferably MPG. The mixture with or without the diluent is then stirred for 30 to 60 minutes at a temperature of about 70 to 80 or 90 degrees Celsius before cooling to room temperature to form a stable liquid ingredient composition according to the invention.

Process 2 comprises charging the solid fatty acids (completely free from lumps) selected from lauric acid or a mixture of lauric acid and myristic acid in a reaction vessel and mixing these fatty acids with oleic acid in the reaction vessel in the desired weight ratio under inert conditions, for example by means of purging with a nitrogen flow. The temperature is increased to about 60 to 70 degrees Celsius to melt the fatty acids while slowly stirring. Subsequently, lactic acid (LA) is slowly added to the reaction mixture under gentle stirring. After complete addition of the lactic acid, a potassium or sodium based base is added step wise under gentle stirring, while making sure that the temperature of the reaction mixture does not exceed 90° C. Preferably, the base comprises sodium hydroxide or potassium hydroxide.

When the addition of the base is completed, the temperature of the reaction mixture is gradually increased to about 160 to 170 or 180 degrees Celsius. Subsequently, the pressure in the reaction vessel is stepwise decreased to about 40 to 50 to 60 mbar by use of a vacuum pump and the temperature is further raised to about 180 to 190 degrees Celsius. After reaching the desired acid value, the vacuum is released, for example by means of purging with a nitrogen flow and the vessel is cooled to about 90 to 100 degrees Celsius. As optional subsequent step, the diluent from the present invention may be added to the reaction mixture in the same reaction vessel. Alternatively, the blending with diluent can be done in a separate reaction vessel. The final blend is subsequently allowed to cool down to room temperature to form a stable liquid ingredient composition according to the invention.

The present invention is illustrated by means of the following examples. These examples are for illustrative purposes only.

EXAMPLES

Example 1: Selection of Suitable Stabilizer

A variety of components were tested on their suitability for stabilising a LL/ML-blend comprising of about 70 wt. % lauroyl lactylate and sodium salts thereof (LL) and 30 wt. % myristoyl lactylate and sodium salts thereof (ML). The resulting liquid ingredient composition should be stable between about 0 and 40° C. In some cases, a diluent was added as some of the potential stabilizers caused viscosity issues that were hampering the handling of the resulting liquid ingredient composition.

The stability of the liquid ingredient composition containing the LL/ML-blend, the stabilizer and optional diluent was determined at different temperatures (i.e. about 1, 20, 40° C.) during 4 weeks of storage. The stability was monitored visually. The results are shown in Table 1. "Yes or y" means that the composition remained homogeneously stable during the 4 weeks of storage at the cited temperature. "No or n" means that phase separation, precipitation or gelation was visually observed to occur during the 4 weeks of storage at the cited temperature. A horizontal stripe '-' means that the corresponding composition was no longer stable and therefore excluded from the stability test. A tilde '~' means that the visual observation did not give a fully clear result (i.e. stable or not stable).

Percentages are all weight based and the temperature in degrees Celsius (° C.). RT stands for room temperature which is approximately 20° C.

A composition comprising for example '30% LL/ML-blend+70% Sunflower oil' means that the liquid ingredient composition comprises 30% wt. % of the LL/ML-blend and 70 wt. % of sunflower oil based on the total weight of the composition.

Hydriol® LLA, ex Hydrior AG is a commercially available product for personal care applications, that consists of 30 wt. % LL in water. MPG is monopropylene glycol (1,2-propanediol). Lactic acid FCC80 is 80% lactic acid in water, Lactic acid HS100 is 100% lactic acid, Sodium lactate 60% is 60% sodium lactate in water, PEG 400 (average Mn=400 g/mole) is polyethylene glycol.

TABLE 1

Thermal stability of a LL/ML-blend in various stabilisers and diluents during 4 weeks storage at different temperatures

| | RT 20° C. | | | | | 1° C. | | | | 40° C. | | | |
|---|---|---|---|---|---|---|---|---|---|---|---|---|---|
| | Weeks | | | | | | | | | | | | |
| Compositions in wt. % | 0 | 1 | 2 | 3 | 4 | 1 | 2 | 3 | 4 | 1 | 2 | 3 | 4 |
| 30% LL/ML-blend in water (pH > 7) | y | y | y | y | y | n | — | — | — | n | — | — | — |
| 30% LL/ML-blend in water with 1% Citrate | y | y | y | y | y | n | — | — | — | n | — | — | — |
| 30% LL/ML-blend + 70% Hydriol LLA | y | y | y | y | y | n | — | — | — | n | — | — | — |
| 30% LL/ML-blend + 70% Sunflower oil | n | — | — | — | — | — | — | — | — | — | — | — | — |
| 30% LL/ML-blend + 70% Castor oil | n | — | — | — | — | — | — | — | — | — | — | — | — |
| 30% LL/ML-blend + 35% Coconut oil + 35% MPG | n | — | — | — | — | — | — | — | — | — | — | — | — |
| 30% LL/ML-blend + 35% Palm oil + 35% MPG | n | — | — | — | — | — | — | — | — | — | — | — | — |
| 30% LL/ML-blend + 35% Sunflower oil + 35% MPG | n | — | — | — | — | — | — | — | — | — | — | — | — |
| 30% LL/ML-blend + 35% Castor oil + 35% MPG | y | y | y | y | y | n | — | — | — | y | y | y | y |
| 30% LL/ML-blend + 70% Lactic acid FCC80 | y | y | y | y | y | n | — | — | — | y | y | y | y |
| 30% LL/ML-blend + 35% Lactic acid FCC80 + 35% MPG | y | y | y | y | y | n | — | — | — | y | y | y | y |
| 30% LL/ML-blend + 70% Lactic acid HS100 | y | y | y | y | y | n | — | — | — | n | n | n | n |
| 30% LL/ML-blend + 70% Sodium Lactate 60% | n | — | — | — | — | — | — | — | — | — | — | — | — |
| 30% LL/ML-blend + 35% Sodium Lactate 60% + 35% MPG | y | y | y | y | n | n | — | — | — | y | y | y | y |
| 30% LL/ML-blend + 35% water + 35% MPG | y | y | y | y | y | n | — | — | — | y | y | y | y |
| 30% LL/ML-blend + 35% water + 35% PEG400 | n | — | — | — | — | — | — | — | — | — | — | — | — |
| 30% LL/ML-blend + 35% water + 35% Glycerol | n | — | — | — | — | — | — | — | — | — | — | — | — |
| 30% LL/ML-blend + 70% PEG400 | n | — | — | — | — | — | — | — | — | — | — | — | — |
| 30% LL/ML-blend + 70% MPG | y | y | y | y | | n | — | — | — | y | y | y | |
| 40% LL/ML-blend + 60% MPG | y | y | y | y | y | n | — | — | — | y | y | y | y |
| 50% LL/ML-blend + 50% MPG | y | y | y | y | y | n | — | — | — | y | y | y | y |
| 60% LL/ML-blend + 40% MPG | y | y | y | y | y | n | — | — | — | y | y | y | y |
| 30% LL/ML-blend + 70% glycerol | n | — | — | — | — | — | — | — | — | — | — | — | — |
| 30% LL/ML-blend + 70% ethanol | n | — | — | — | — | — | — | — | — | — | — | — | — |
| 30% LL/ML-blend + 70% methyl decanoate | n | — | — | — | — | — | — | — | — | — | — | — | — |
| 30% LL/ML-blend + 70% methyl dodecanoate | n | — | — | — | — | — | — | — | — | — | — | — | — |
| 30% LL/ML-blend + 70% Tricaprylin | n | — | — | — | — | — | — | — | — | — | — | — | — |
| 30% LL/ML-blend + 35% Tricaprylin + 35% MPG | y | n | — | — | — | n | — | — | — | n | — | — | — |
| 30% LL/ML-blend + 35% isostearoyl lactylate + 35% MPG | y | y | y | y | y | n | — | — | — | n | — | — | — |
| 30% LL/ML-blend+35% sodium stearoyl lactylate+35% MPG | n | — | — | — | — | n | — | — | — | n | — | — | — |
| 10% LL/ML-blend + 90% OL | y | y | y | y | y | y | y | y | y | y | y | y | y |
| 20% LL/ML-blend + 80% OL | y | y | y | y | y | y | y | y | y | y | y | y | y |
| 30% LL/ML-blend + 70% OL | y | y | y | y | y | y | y | y | y | y | y | y | y |
| 40% LL/ML-blend + 60% OL | y | y | y | y | y | y | y | y | y | y | y | y | y |
| 50% LL/ML-blend + 50% OL | y | y | y | y | y | y | y | y | y | y | y | y | y |
| 55% LL/ML-blend + 45% OL | y | y | y | y | y | y | y | y | y | y | y | y | y |
| 10% LL/ML-blend + 50% OL + 40% MPG | y | y | y | y | y | y | y | y | y | y | y | y | y |
| 10% LL/ML-blend + 60% OL + 30% MPG | y | y | y | y | y | y | y | y | y | y | y | y | y |
| 10% LL/ML-blend + 70% OL + 20% MPG | y | y | y | y | y | y | y | y | y | y | y | y | y |
| 10% LL/ML-blend + 80% OL + 10% MPG | y | y | y | y | y | y | y | y | y | y | y | y | y |
| 20% LL/ML-blend + 20% OL + 60% MPG | y | y | y | y | y | y | y | y | y | y | y | y | y |
| 20% LL/ML-blend + 40% OL + 40% MPG | y | y | y | y | y | y | y | y | y | y | y | y | y |
| 20% LL/ML-blend + 50% OL + 30% MPG | y | y | y | y | y | y | y | y | y | y | y | y | y |
| 20% LL/ML-blend + 60% OL + 20% MPG | y | y | y | y | y | y | y | y | y | y | y | y | y |
| 20% LL/ML-blend + 70% OL + 10% MPG | y | y | y | y | y | y | y | y | y | y | y | y | y |
| 25% LL/ML-blend + 35% OL + 40% MPG | y | y | y | y | y | y | y | y | y | y | y | y | y |
| 30% LL/ML-blend + 10% OL + 60% MPG | y | y | y | y | y | n | — | — | — | y | y | y | y |
| 30% LL/ML-blend + 20% OL + 50% MPG | y | y | y | y | y | y | y | y | y | y | y | y | y |
| 30% LL/ML-blend + 30% OL + 40% MPG | y | y | y | y | y | y | y | y | y | y | y | y | y |
| 30% LL/ML-blend + 35% OL + 35% MPG | y | y | y | y | y | y | y | y | y | y | y | y | y |
| 30% LL/ML-blend + 40% OL + 30% MPG | y | y | y | y | y | y | y | y | y | y | y | y | y |
| 30% LL/ML-blend + 50% OL + 20% MPG | y | y | y | y | y | y | y | y | y | y | y | y | y |
| 30% LL/ML-blend + 60% OL + 10% MPG | y | y | y | y | y | y | y | y | y | y | y | y | y |
| 40% LL/ML-blend + 10% OL + 50% MPG | y | y | y | y | y | n | — | — | — | y | y | y | y |
| 40% LL/ML-blend + 40% OL + 20% MPG | y | y | y | y | y | y | y | y | ~ | y | y | y | y |
| 40% LL/ML-blend + 50% OL + 10% MPG | y | y | y | y | y | y | y | y | y | y | y | y | y |
| 50% LL/ML-blend + 10% OL + 40% MPG | y | y | y | y | y | n | — | — | — | y | y | y | y |
| 30% LL/ML-blend + 30% OL + 40% PEG400 | y | n | — | — | — | n | — | — | — | n | — | — | — |
| 30% LL/ML-blend + 30% OL + 40% Castor oil | n | — | — | — | — | — | — | — | — | — | — | — | — |
| 30% LL/ML-blend + 30% OL + 40% Sunflower oil | y | y | y | y | y | y | y | y | y | y | y | y | y |
| 30% LL/ML-blend + 30% OL + 40% Tricaprylin | y | y | y | y | y | y | y | y | y | y | y | y | y |
| 30% LL/ML-blend + 30% OL + 40% Sodium lactate 60% | y | y | y | y | y | y | ~ | n | — | y | n | — | — |

Table 1 shows that many components are not suited as stabilizer for the LL/ML-blend. Surprisingly, when oleyl lactylate and salts thereof (OL) is used, a stable LL/ML-blend is obtained at the temperatures of interest, ranging from around 0.5 to 1 degree Celsius up to around and including 40 degrees Celsius for at least 4 weeks.

Example 2: Viscosity of the Composition

As mentioned, the liquid ingredient composition of the present invention may be reduced in its viscosity by addition of a diluent such as for example monopropylene glycol (MPG: 1,2-propanediol). Table 2 shows the effect of different ratios of OL and MPG on said viscosity.

The viscosity was measured with a Brookfield DV-I prime LVDV-IP viscometer.

TABLE 2

Viscosity of liquid ingredient compositions as measured on a Brookfield DV-I prime LVDV-IP at room temperature

| Liquid formulation | Viscosity (cP) | Spindle |
|---|---|---|
| 30 wt. % LL/ML-blend + 70 wt. % OL | 1260 | S64 at 20 RPM |
| 30 wt. % LL/ML-blend + 35 wt. % OL + 35 wt. % MPG | 617 | S63 at 20 RPM |
| 30 wt. % LL/ML-blend + 30 wt. % OL + 40 wt. % MPG | 510 | S63 at 100 RPM |

Example 3: Various LL/ML-Blend:OL:MPG Compositions

The LL/ML-blend that was used in previous examples was added to various OL/MPG compositions to evaluate thermal stability. The samples were monitored at about 1° C. and 40° C. and this time for 3 months. The thermal stability was assessed visually.

The results are compiled in Table 3.

TABLE 3

Thermal stability of various LL/ML-blend:OL:MPG ingredient compositions after 3 months

| Percentage (wt. %) | | | Stable at | Stable at |
|---|---|---|---|---|
| LL/ML-blend | OL | MPG | 1° C. | 40° C. |
| 30 | 10 | 60 | no | — |
| 30 | 30 | 40 | yes | yes |
| 30 | 35 | 35 | yes | yes |
| 40 | 0 | 60 | no | — |
| 40 | 10 | 50 | no | — |
| 50 | 0 | 50 | no | — |
| 50 | 10 | 40 | no | — |
| 60 | 0 | 40 | no | — |

No = composition was stable at 1° C. for less than 2 weeks

The results of this study show that mixtures consisting of only LL/ML-blend and MPG are not thermally stable at 1° C. Addition of OL helps to improve the thermal stability at 1° C. The results also show that the ratio LL/ML-blend:OL should preferably be close or equal to 1:1 to maintain a good thermal stability at low temperatures.

Example 4: Stability Measurement by pH and Acid Value Monitoring

The stability of the liquid ingredient composition consisting of LL/ML-blend:OL:MPG in the ratio 30:35:35% by weight (see Tables 1 and 3), was measured by monitoring the acid value while keeping the composition at 20° C. and 40° C. for 4 weeks, see FIG. 1. In addition, the pH of this liquid ingredient composition was measured at 30° C. and 40° C. for a period of 3 weeks, see FIG. 2. The liquid ingredient composition turned out to remain stable (by visual assessment), with no significant increase in pH or acid value during a period of at least 3 weeks.

Example 5: Thermal Stability of Stock Solutions

The stable liquid ingredient composition may be dosed via a Dosatron® dosing system to drinking water. Such a Dosatron® system requires a stock solution (i.e. concentrated solution in water) to realize an accurate dosing level. In this example, the stability of a 5 wt. % stock solution from LL/ML-blend:OL:MPG=30:30:40 by weight was tested in tap water.

Stock solutions (5 wt. % liquid ingredient composition in tap water) were prepared from some of the thermally stable LL/ML-based liquid ingredient compositions as described in Example 1. The majority of ingredient compositions which did not show stability at the lower temperature of 1 or at 20 degrees Celsius in Table 1, have not been further tested in a stock solution. The results of the thermal stability tests for some remaining stock solutions are shown in Table 4. The letters, numbers and symbols have the same meaning as described for Table 1, Example 1.

TABLE 4

Thermal stability of various stock solutions (5 wt. % in tap water) based on the LL/ML-blend according to the present invention

| 5 wt. % stock solutions of | RT 20° C. | | | | | 1° C. | | | | 40° C. | | | |
|---|---|---|---|---|---|---|---|---|---|---|---|---|---|
| | Time in Weeks | | | | | | | | | | | | |
| compositions from Table 1 | 0 | 1 | 2* | 3 | 4 | 1 | 2* | 3 | 4 | 1 | 2* | 3 | 4 |
| 30% LL/ML-blend + 35% Castor oil + 35% MPG | ~ | ~ | | ~ | ~ | n | — | — | — | n | — | — | — |
| 30% LL/ML-blend + 35% water + 35% MPG | y | y | | y | y | n | — | — | — | y | | y | y |
| 20% LL/ML-blend + 20% OL + 60% MPG | y | y | y | y | y | y | y | y | y | y | y | y | y |
| 20% LL/ML-blend + 40% OL + 40% MPG | y | y | y | y | y | y | y | y | y | y | — | n | — |

TABLE 4-continued

Thermal stability of various stock solutions (5 wt. % in tap water) based on the LL/ML-blend according to the present invention

| 5 wt. % stock solutions of | RT 20° C. Time in Weeks | | | | | 1° C. | | | | 40° C. | | | |
|---|---|---|---|---|---|---|---|---|---|---|---|---|---|
| compositions from Table 1 | 0 | 1 | 2* | 3 | 4 | 1 | 2* | 3 | 4 | 1 | 2* | 3 | 4 |
| 20% LL/ML-blend + 60% OL + 20% MPG | y | y | y | y | y | y | y | y | y | y | n | — | — |
| 30% LL/ML-blend + 30% OL + 40% MPG | y | y | | y | y | y | | y | y | y | | y | ~ |
| 30% LL/ML-blend + 70% OL | y | n | — | — | — | n | — | — | — | n | — | — | — |
| 50% LL/ML-blend + 50% OL | y | n | — | — | — | n | — | — | — | n | — | — | — |

*Week 2: no visual observation was performed

Table 4 shows that not all stable liquid ingredient compositions of Table 1 are thermally stable at temperatures of about 0.5 and 1 degree Celsius to around 20 degrees Celsius, or even up to 40 degrees Celsius when diluted to a stock solution of 5 wt. %. Only a liquid ingredient composition comprising LL or a LL/ML-blend, and OL as stabilizer and a diluent selected from MPG show the desired thermal stability when dispersed in water to form a 5 wt. % stock solution.

Example 6: Preparation of a Liquid Ingredient Composition According to the Present Invention This example demonstrates how the stable liquid ingredient composition consisting of LL/ML-blend and OL according to the present invention may be prepared.

There are two options:

1) Physical Blending

The LL/ML-blend (70/30 wt. % LL/ML) (Pationic® 138c ex Corbion) was first melted in an oven at 90° C.

30 wt. % (based on the total weight of the composition) of this pre-heated LL/ML-blend was added to a pre-heated reaction vessel and kept at 80° C. under continuous stirring and preferably under a nitrogen blanket. Subsequently, 30 wt. % OL (based on the total weight of the composition) (Olacta® ex Corbion) was added. The reaction mixture was diluted by addition of 40 wt. % MPG (based on the total weight of the composition). The resulting blend was stirred for 45-60 minutes at a temperature of 80° C. The blend was subsequently poured into cans and further allowed to cool down to room temperature and kept for storage at room temperature.

2) One-Pot Synthesis

The fatty acids (completely free from lumps) lauric acid, myristic acid and oleic acid in the desired weight ratio, were charged to a reaction vessel that was purged with a nitrogen flow. The temperature was increased to 60-70° C. to melt the fatty acids while slowly stirring. Subsequently, lactic acid (LA) was slowly added to the reaction mixture under gentle stirring. After complete addition of the lactic acid, sodium hydroxide (NaOH, 50% solution in water) was added step wise under gentle stirring, while making sure that the temperature of the reaction mixture did not exceed 90° C.

When the addition the NaOH solution was completed, the temperature of the reaction mixture was gradually increased to 150° C. When the temperature of the reaction mixture reached 150° C., the amount of distillate was weighed and the receiving flask was emptied. The temperature of the reaction mixture was then slowly increased to 170° C. Subsequently, the pressure in the reaction vessel was step-wise decreased to about 50 mbar by use of a vacuum pump and the temperature was further raised to about 190° C. After reaching the desired acid value, the vacuum was released by purging with a nitrogen flow and the vessel was cooled to 100° C. The reaction was complete (i.e. reaching the desired acid value) after 4 hours. Analysis showed that a lactylate composition was obtained. The final stable liquid ingredient composition was obtained by adding 40 wt. % diluent (i.e. MPG) to a reaction vessel containing 60 wt. % of pre-heated lactylate mixture obtained via the one-pot synthesis method as described above. After mixing for 45-60 minutes, the final blend was transferred to cans and further allowed to cool down to room temperature.

Example 7: Activity of the Composition According to the Invention Against Various Clostridia and Streptococci Strains Two experiments were performed. For the first experiment, only the LL/ML-blend was tested against several Clostridia strains. For the second experiment, the (LL/ML-blend):OL composition, the (LL/ML-blend):OL:MPG composition and also MPG alone were tested against *Clostridium perfringens* and several *Streptococcus suis* strains. A stock solution containing 0.1% (w/v) of test sample was made and tested for its activity against the following strains: *Clostridium perfringens ATCC* 13124, *Clostridium perfringens* NCCB 87108, *Clostridium perfringens* NCTC 11144, *Clostridium sporogenes* NCTC 12935, *Clostridium sporogenes* NCTC 8594, *Clostridium sporogenes* NCTC 532, *Clostridium sporogenes*, NCTC 13020, *Clostridium tyrobutyricum* AR 439, *Streptococcus suis* DSM 28762 and *Streptococcus suis* DSM 9682.

To this end, all Clostridia cultures were grown overnight at 37° C. in screw capped tubes (100×16 mm) containing 9 ml of Cooked Meat medium (Oxoid), without shaking. The *Streptococcus* strains were grown overnight at 30° C. in screw capped tubes (100×16 mm) containing 9 ml of Brain Heart Infusion medium (Oxoids), without shaking.

The stock solutions were heated up, and 5 M NaOH was added till the compounds were dissolved and a clear solution was obtained. Then for the Clostridia strains, 2×TPGY broth (Trypticase-Peptone-Glucose-Yeast Extract Broth; pancreatic digest of casein 50 g/L, yeast extract 20 g/L, peptone 5.0 g/L, glucose 4.0 g/L and sodium thioglycolate 1.0 g/L) while for the *Streptococcus* strains, 2×BHI broth was prepared. For both broths, the pH was set to 6.5 and used to make 10 different stock solutions with increasing amounts of the corresponding compound. Two different concentrations ranges were prepared: one range from 0-0.0018% in 10 steps of 0.0002% and a second range from 0-0.00045% in 10 steps of 0.00005%. Completed media were sterilized by autoclaving. Then 200 μl of each solution was transferred into a sterile Bioscreen honeycombed 100 well plate (Oy Growth Curves Ab Ltd, Helsinki, Finland). Filled plates were placed overnight in the Bioscreen which was placed inside an Invivo2 hypoxia anaerobic cabinet (Ruskinn Technology Ltd/Ruskinn Life Sciences Ltd, Bridgend, UK) equipped with a Rushkinn gasMixer Q(N2) of which the oxygen level was set to 0.1%. Bioscreen plates were inoculated with 3 μl of the 10× diluted actively grown Clostridia cultures and *Streptococcus* cultures. The plates were incubated for 72 hours at 37° C. for Clostridia and 30° C. in case of *S. suis*. The optical density of the cultures was measured every 20 minutes at 420-580 nm using a wide band filter by the Bioscreen C (Oy Growth Curves Ab Ltd, Helsinki, Finland). The plates were moderately shaken before each reading. After the growth experiments, the final growth on the plates was checked by eye, and also by microscope to confirm the results.

Minimal inhibitory concentration (MIC) values were determined for all strains. The results are compiled below in Tables 5 and 6.

TABLE 5

Experiment 1: MIC values in ppm for LL/ML-blend (70/30 ratio by weight) against various *Clostridium* strains for 72 hours at 37° C.

| Strains | MIC value for LL/ML-blend = 70/30 ratio by weight (in ppm) |
|---|---|
| *Clostridium perfringens* ATCC 13124 | 10 |
| *Clostridium perfringens* NCCB 87108 | 10 |
| *Clostridium perfringens* NCTC 11144 | 14 |
| *Clostridium sporogenes* NCTC 12935 | 10 |
| *Clostridium sporogenes* NCTC 8594 | 10 |
| *Clostridium sporogenes* NCTC 532 | 10 |
| *Clostridium sporogenes* NTCT 13020 | 12 |
| *Clostridium tyrobutyricum* AR 439 | 8 |

TABLE 6

Experiment 2: MIC values in ppm of the (LL/ML)/OL blend with and without MPG, and MPG alone against *Clostridium perfringens* and two *Streptococcus suis* strains for 72 hours at 30° C.

| Strains | MIC value for LL/ ML-blend:OL = 50:50 wt. % | MIC value for LL/ML-blend: OL:MPG = 30:30:40 wt. % | MIC value for MPG |
|---|---|---|---|
| *Clostridium perfringens* ATCC 13124 | 6 | 14 | >405 |
| *Streptococcus suis* DSM 28762 | 8 | 9 | >405 |
| *Streptococcus suis* DSM 9682 | 6 | 15 | >405 |

Example 8: Stable LL-Based Liquid Ingredient Compositions

The stability of the liquid ingredient composition containing lauryl lactylate (LL) and oleyl lactylate (OL) and optionally monopropylene glycol (MPG) as diluent was determined at different temperatures (i.e. about 1, 20, and 40° C.) during 4 weeks of storage. The stability was monitored visually. The results are shown in Table 7. The letters, numbers and symbols have the same meaning as described for Table 1, Example 1. Percentages are all weight based and the temperature in degrees Celsius (° C.). RT stands for room temperature which is approximately 20° C.

TABLE 7

Thermal stability of liquid ingredient compositions containing LL and OL during 4 weeks storage at different temperatures

| | RT 20° C. | | | | | 1° C. | | | | 40° C. | | |
|---|---|---|---|---|---|---|---|---|---|---|---|---|
| | Weeks | | | | | | | | | | | |
| Compositions | 0 | 1 | 2 | 3 | 4 | 1 | 2 | 3 | 4 | 1 | 2 | 3 | 4 |
| 50% LL + 50% OL | y | y | y | y | y | y | y | y | y | y | y | y | y |
| 30% LL + 20% OL + 50% MPG | y | y | y | y | y | y | y | y | y | y | y | y | y |
| 30% LL + 40% OL + 30% MPG | y | y | y | y | y | y | y | y | y | y | y | y | y |
| 40% LL + 40% OL + 20% MPG | y | y | y | y | y | y | y | y | ~ | y | y | y | y |

Example 9: Stability of Stock Solutions from LL-Based Liquid Ingredient Compositions A stock solution (5 wt. % in tap water) was prepared from some of stable the LL-based liquid ingredient compositions of Example 8 and the stability determined at different temperatures (i.e. about 1, 20, and 40° C.) during 4 weeks of storage. The stability was monitored visually. The results of the thermal stability test are shown in Table 8. The letters, numbers and symbols have the same meaning as described for Table 1, Example 1.

TABLE 8

Thermal stability of stock solution (5 wt. % in tap water) of the LL-based liquid ingredient composition.

| | RT 20° C. | | | | | 1° C. | | | | 40° C. | | |
|---|---|---|---|---|---|---|---|---|---|---|---|---|
| | Weeks | | | | | | | | | | | |
| Compositions | 0 | 1 | 2 | 3 | 4 | 1 | 2 | 3 | 4 | 1 | 2 | 3 | 4 |
| 30% LL + 20% OL + 50% MPG | y | y | y | y | y | y | y | y | y | y | y | y | ~ |
| 30% LL + 40% OL + 30% MPG | y | y | y | y | y | y | y | y | y | y | y | y | ~ |

The invention claimed is:

1. A stable liquid ingredient composition comprising:

oleyl lactylate and/or salts thereof (OL);

a further lactylate selected from lauroyl lactylate and/or salts thereof (LL) or a mixture of lauroyl lactylate and myristoyl lactylate and/or their salts (LL/ML-blend); and a diluent, wherein the diluent comprises monopropylene glycol (MPG).

2. The stable liquid ingredient composition according to claim 1, wherein the selected lactylate is lauroyl lactylate and/or salts thereof and wherein the lauryl lactylate and/or salts thereof (LL), and oleyl lactylate and salts thereof (OL) are present in a LL/OL weight ratio ranging from about 1/99 to 60/40.

3. The stable liquid ingredient composition according to claim 1, wherein the selected lactylate is a mixture of lauroyl lactylate and myristoyl lactylate and/or their salts (LL/ML-blend) and wherein the LL/ML blend, and oleyl lactylate and salts thereof (OL) are present in a (LL/ML-blend)/OL weight ratio ranging from about 1/99 to 60/40.

4. The stable liquid ingredient composition according to claim 3, wherein the LL/ML-blend comprises, based on the total amount of LL and ML, 50-95 wt. % of LL and 50-5% wt. % of ML.

5. The stable liquid ingredient composition according to claim 1, the diluent is present in an amount ranging from 1-70 wt. % based on the total weight of the composition.

6. The stable liquid ingredient composition according to claim 5, wherein the lactylate selected from LL or the LL/ML-blend is present in concentrations of 10 to 40 wt. %, OL is present in concentrations of 20 to 80 wt. % and the diluent is present in 10 to 60 wt. % based on the total weight of the composition.

7. The stable liquid ingredient composition according to claim 5, wherein the composition comprises 25-35 wt. % of the lactylate selected from LL or LL/ML blend, 25-35 wt. % of the OL and 30-50 wt. % of MPG based on the total weight of lactylates and diluent.

8. A stable stock solution comprising 0.4 to 12 wt. % of the liquid ingredient composition according to claim 1 in water based on the total weight of the stock solution.

* * * * *